Sept. 15, 1964 M. FAUCONNIER 3,148,785

HANDLING AND STORAGE SYSTEM

Filed April 5, 1961 11 Sheets-Sheet 1

HANDLING AND STORAGE SYSTEM

Sept. 15, 1964 M. FAUCONNIER 3,148,785

HANDLING AND STORAGE SYSTEM

Filed April 5, 1961 11 Sheets-Sheet 3

Sept. 15, 1964 M. FAUCONNIER 3,148,785

HANDLING AND STORAGE SYSTEM

Filed April 5, 1961 11 Sheets-Sheet 6

Sept. 15, 1964 M. FAUCONNIER 3,148,785

HANDLING AND STORAGE SYSTEM

Filed April 5, 1961 11 Sheets-Sheet 7

Sept. 15, 1964 M. FAUCONNIER 3,148,785

HANDLING AND STORAGE SYSTEM

Filed April 5, 1961 11 Sheets-Sheet 8

Sept. 15, 1964 M. FAUCONNIER 3,148,785

HANDLING AND STORAGE SYSTEM

Filed April 5, 1961 11 Sheets-Sheet 9

Sept. 15, 1964 M. FAUCONNIER 3,148,785

HANDLING AND STORAGE SYSTEM

Filed April 5, 1961 11 Sheets-Sheet 10

United States Patent Office 3,148,785

Patented Sept. 15, 1964

3,148,785

HANDLING AND STORAGE SYSTEM

Marcel Fauconnier, 50 Ave. Charles Floquet, Paris, France, assignor of one-half to Compagnie de Signaux et d'Entreprises Electriques, Paris, France, a French company Filed Apr. 5, 1961, Ser. No. 100,897
Claims priority, application France, Apr. 15, 1960, 824,566, Patent 1,262,052
4 Claims. (Cl. 214—16.1)

This invention relates to load handling and storage systems and, while broadly applicable to the handling and storage of heavy, bulky articles of any description, its chief uses are in connection with the handling of motor vehicles, in garages, parking lots and the like.

The tremendous growth of private car ownership in industrialized countries in recent years has raised acute problems in connection with the parking of motor cars in and around crowded city areas. It is going to be essential in the immediate future to provide increased numbers of large-capacity parking lots and/or garages, of above-ground or underground construction, provided with all facilities for moving great numbers of cars into and out of their parking locations within minimum time.

Objects of this invention, therefore, include the provision of:

Improved means for transferring heavy, bulky loads into and out of storage location;

A load handling and storage system, especially in a garage, wherein storage space is used with maximum efficiency and access time to and from any storage location is minimized;

A load handling and storage system, especially in a garage, wherein all the power operations involved in transferring an incoming vehicle from an input to a vacant storage location and an outgoing vehicle from its storage location to an output, can be controlled from a central control station without or substantially without human intervention other than an initial command, which in turn may be issued by the vehicle owner himself without requiring a garage attendant;

A load handling and storage system, especially a garage, having a plurality of storage locations and including means for automatically identifying and selecting a vacant storage location that can be reached in minimum access time and thereupon automatically transferring an incoming load, e.g. vehicle, from an input of the system to the selected storage location.

Secondary, though important, objects relate to the provision of various improved load handling means especially suited for motor vehicles.

In accordance with one of the more useful, though perhaps not the broadest, aspect of the invention, there is provided a vehicle handling and storage system having an input, an output and a plurality of storage locations between the input and output; shiftable platform means displaceable for creating a continuous path of access from the input to any one of said locations and from any one of said locations to said output; power means for displacing the shiftable means to create such a path and further power means for transferring a vehicle along the path thus created; a central control station including electrical means responsive to a digital code signal designating a selected one of said storage locations; and digital circuitry for converting said location-designating signal into command signals for selectively and sequentially operating said power means to convey a vehicle from said input to said selected storage location and thence subsequently to said output.

An exemplary embodiment of the invention will now be described for purposes of illustration but not of limitation with reference to the accompanying drawings, wherein.

GENERAL DESCRIPTION

Figure 1:
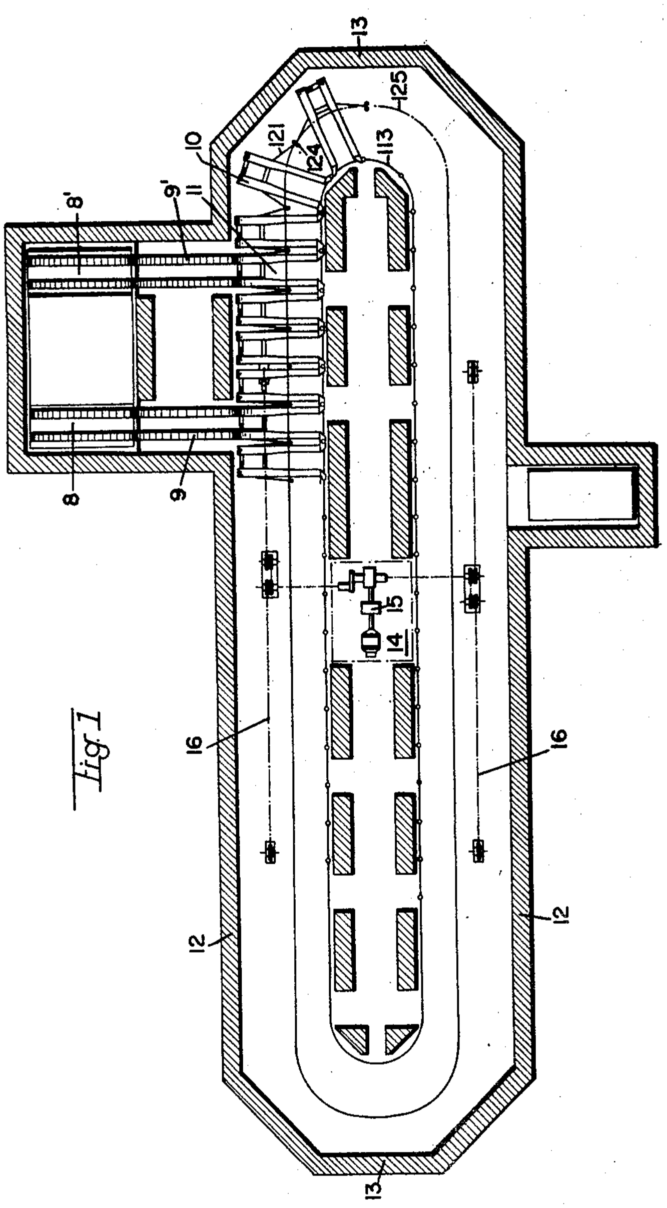
FIG. 1 is a schematic view in horizontal cross section showing one level of an underground garage constructed in accordance with the invention and including movable storage location only.
Figures 2, 3, 4:
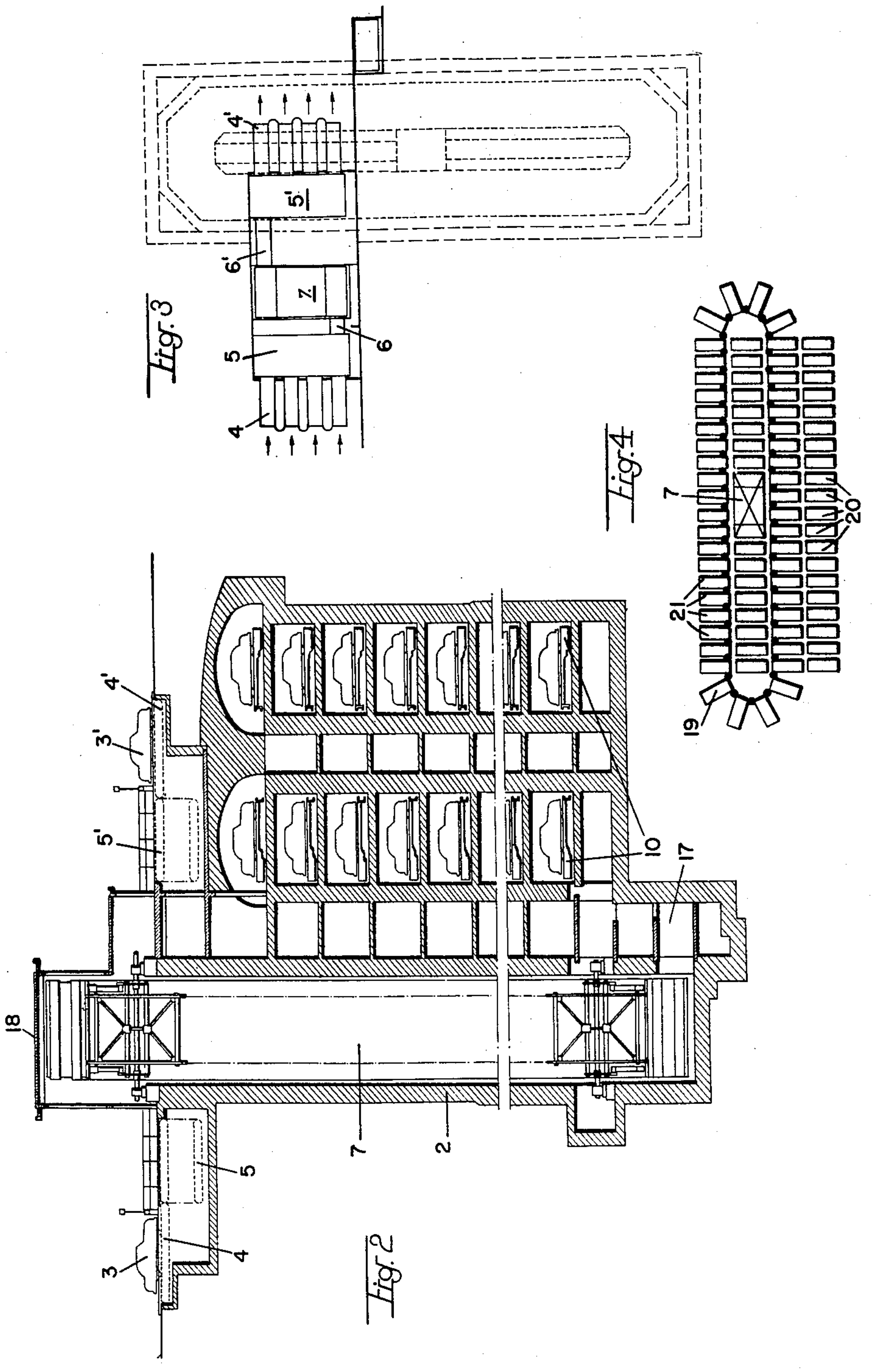
FIG. 2 is a view of the underground garage of FIG. 1 in vertical section.
FIG. 3 is an overhead plan view illustrating the surface structure of the garage including input and output facilities.
FIG. 4 is a fragmentary plan view corresponding to FIG. 1 but illustrating a modified layout of an underground level including fixed parking locations.

Referring first to FIGS. 1, 2 and 3, the invention is shown as embodied in an underground garage, the ground surface being indicated at 4. The general building construction work involved forms no part of this invention nor will it be described in any detail, it being sufficient to note that the structure shown, generally designated by reference 2, includes a surface building 18 which may comprise a central control station and other facilities, a vertical elevator shaft, and underground levels for receiving the vehicles and the handling apparatus to be described. The general layout of the structure can be quite easily grasped from a consideration of the drawings in the light of the explanations to be given.

The disclosure will now proceed with a description of the main units of the installation in succession, in the order they are reached by a vehicle entering, traversing and leaving the garage. Considering such a vehicle 3, this is first driven on to any one of a number of transversely-spaced, elongated rectangular stationary platforms 4 spaced providing a drive-in or input facility. The input platforms are separated by pedestrian lanes as shown in FIG. 3. The input platforms 4 lead to a set of transversely shiftable input platforms mounted on a conveyor 5 whereby the incoming car can be shifted to a desired position in a transverse direction. The conveyor 5 carrying the input platforms may be generally conventional and does not require detailed description. It may simply comprise a set of endless conveyor chains trained about end pulleys positioned in a pit and rotatable about axes parallel to the direction in which the car was driven to its input position. Conveyor 5 may be termed the presentation conveyor since it serves to present an incoming vehicle to a platform of the elevator unit generally designated 7. Preferably, as shown in FIG. 3, an intermediate platform 6 may be provided between the platforms of conveyor 5 and elevator 7.

The elevator 7 comprises a number of similar reversible platforms 8 which are bodily displaceable vertically over an endless track in the elevator shaft, as will be described in greater detail later. The vehicle under consideration is presented by conveyor 5 to a platform 8 positioned at surface level, and the elevator is operated to lower the said platform with the car positioned thereon to a selected one of the lower levels of the underground garage. The levels may all be similar in layout as will now be described with reference to FIG. 1. As shown, the level comprises an elongated endless track defined by the straight, parallel spaced side portions 12 and the arcuate end portions 13. Displaceable along and around this track is a continuous array (generally designated 11) of movable platforms 10 a few of which are shown. The platforms 10 are interlinked so as to be capable of circulating around the track, in a close parallel array in the straight side portions 12 of it and in fanned-out relationship in the semi-circular end portions 13, as shown. The circulatory platforms 10 will be described in greater detail hereinafter. It will be noted from FIG. 1 that the elevator shaft is positioned somewhat off to one side of the track. The vehicle on being lowered to said level on an elevator platform 8 is transferred by way of an intermediate platform 9 to one of the circulating platforms such as 11 positioned in register therewith. It will be understood that the platforms such as 11 at each level of the garage structure constitute individual storage locations or areas for the vehicles. When it is desired to remove a vehicle from storage, the series of platforms 10 is rotated around the track until the particular platform 11 carrying the desired vehicle is presented to the upgoing side of the elevator, and is then charged on to an upgoing elevator platform 8′ by way of intermediate platform 9′. Preferably the spacing between platforms 9 and 9′, and hence the spacing between the sides of the elevator, corresponds to an integral multiple of the width of platforms 11. The outgoing vehicle is now raised to ground surface upon elevator platform 8′ and then follows a path similar to the previously described path of the ingoing vehicle, in reverse. Thus the car is transferred from the elevator by way of an intermediate platform 6′ to a transverse conveyor 5′ and thence to any desired one of the stationary output platforms 4′, whence the car can be driven away by its owner.

It will be understood that the transverse conveyors 5 and 5′, the elevator 7 and the chain of circulatory platforms 11 at each level are operated by suitable power means, such as electric motors. The power and ancillary equipment is per se conventional and need not be described. By way of indication, however, FIG. 1 schematically shows the power means for driving the circulating platforms 10 around a level track as comprising a motor-reducer unit 15 located in a central chamber 14 of the level and connected through suitable transmission and with endless drive chain means 16 extending around the track. The platforms 10 with their endless drive chain means will be described in greater detail further on.

In FIG. 2, reference 17 designates a number of chambers that may be provided at each level for purposes of servicing, housing equipment, and the like. Reference 18 designates a surface building which may include management accommodation, a control station and similar facilities.

In the system so far described with reference to FIGS. 1 to 3, the storage areas for the vehicles were indicated as comprising exclusively the movable circulatory platforms 10. Preferably however, stationary storage areas are provided at each level in addition to the movable storage areas constituted by the platforms 10. Thus, in the exemplary layout shown in FIG. 4, a typical level is fragmentarily shown as comprising a circulatory chain of platforms 19 similar to the platforms 10 of FIG. 1 and forming the movable storage locations, and in addition the rows of stationary platforms or fixed storage locations 20, extending along a straight side of the endless track, and 21, extending centrally between the two sides of the track. In this modification, the elevator shaft 7 is shown as intersecting the level between the sides of the endless track rather than to one side of it as in FIG. 1. In this case the intermediate platforms 9 and 9′ of FIG. 1 may be dispensed with. Where stationary storage locations are provided such as 20 and 21 in FIG. 4, these would normally constitute long-term storage areas whereas the circulatory platforms 19 would provide temporary or short-term storage areas as will readily be understood.

The longitudinal transfer of vehicles in a horizontal plane from one platform to another (e.g. from a platform 4 to a platform 5 to an elevator platform 8, then from 8 to 9 to a platform 10, and so on), is effected through conveyor means associated with each of the platforms, rather, than the vehicles being driven under their own power. These longitudinal transfer means in the embodiment described comprise endless conveyor chains mounted lengthwise of the platforms) as schematically shown in FIG. 1 in connection with the platforms 8, 9, 9′ and 8′) and powered by motors mounted on certain of the platforms. According to a feature of the invention, not all the platforms are provided with motors, but the platforms provided are of two types, power-platforms and idle platforms. The platforms of the respective types are arranged to alternate along the path of a vehicle through the system, and coupling means are provided whereby a power platform will, when required, drive the conveyor of the adjacent idle or idle platform carrying a vehicle thereon. Thus referring to FIGS. 1–3, according to one convenient arrangement the input and output platforms 4 and 4′ are idle, the platforms on presentation conveyor 5 are power or drive platforms, the elevator platforms 8 (and 8′) are idle, intermediate platforms 9 (and 9′) are powered, and circulatory platforms 10 are idle. On the other hand, in the modification of FIG. 4, it is preferable for the circulatory platforms 19 to be powered, since the stationary locations 20 and 21 would not usually be provided with power means.

Summarizing the system so far described it will be seen that a vehicle 3 from the moment it has been driven on to an input platform 4 can be conveyed to any selected final storage area at any selected underground level such as a movable circulator platform 11 or a stationary platform 20 or 21, and subsequently from its storage location to the output platform 4′, with all movements of the vehicle through the system being accomplished by virtue of the power means provided within the system, including the longitudinal conveyor means provided on the platforms for effecting longitudinal transfer movements of the vehicle, the transverse shifting conveyors 5 and 5′ for effecting transverse horizontal movements og the vehicle, the elevator 7 for effecting vertical movements and the endless drive chains 16 for effecting circulatory or roundabout movements of the vehicle at each level. As will be later described, it is contemplated that all such displacements of the vehicle into and out of storage will be controlled from a central station through suitable remote control apparatus, without manual intervention at any point of the vehicle flowpath. As will also be described, memory means are provided for storing information as to which storage location is holding which vehicle and which storage locations are vacant, whereby the most appropriate vacant location can at any time be selected and an incoming vehicle can be quickly and easily directed thereto through the central control station.

Typical embodiments of the main component units of the system will now be described in greater detail, including the elevator unit 7, power platforms, idle platforms, and circulator chain.

ELEVATOR

Figure 5:
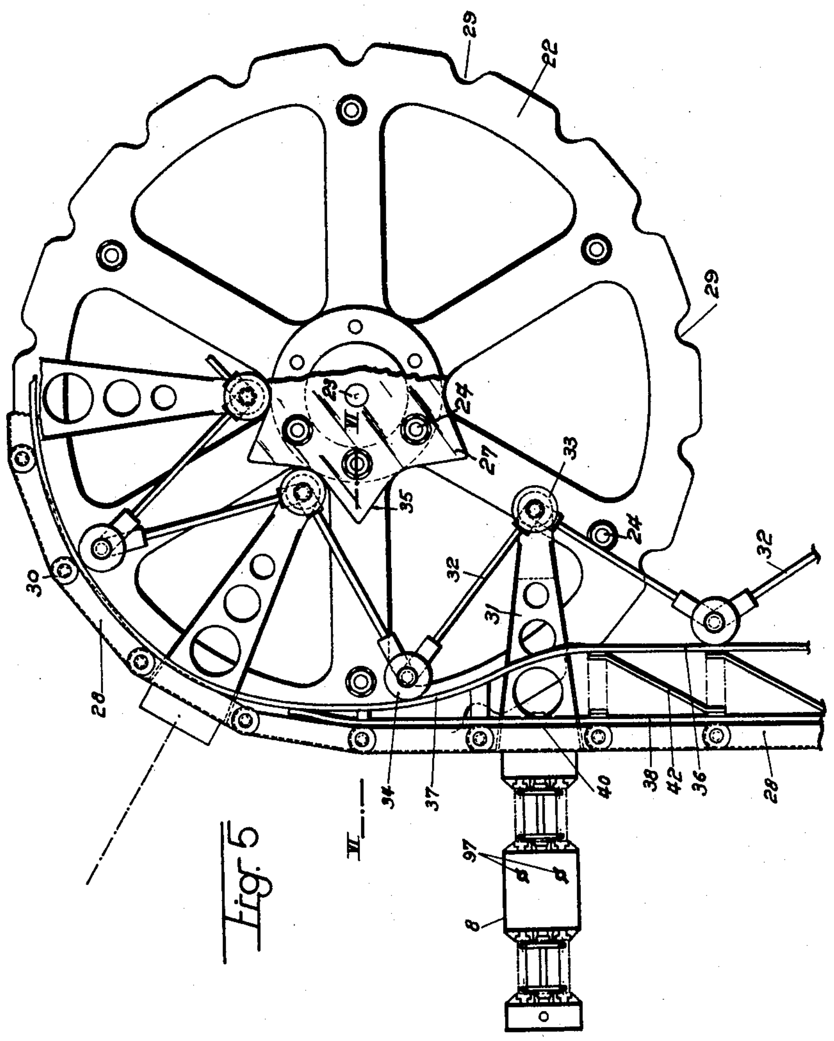
FIG. 5 is an elevational view, partly broken away, showing the upper end part of an elevator structure.
Figure 6:
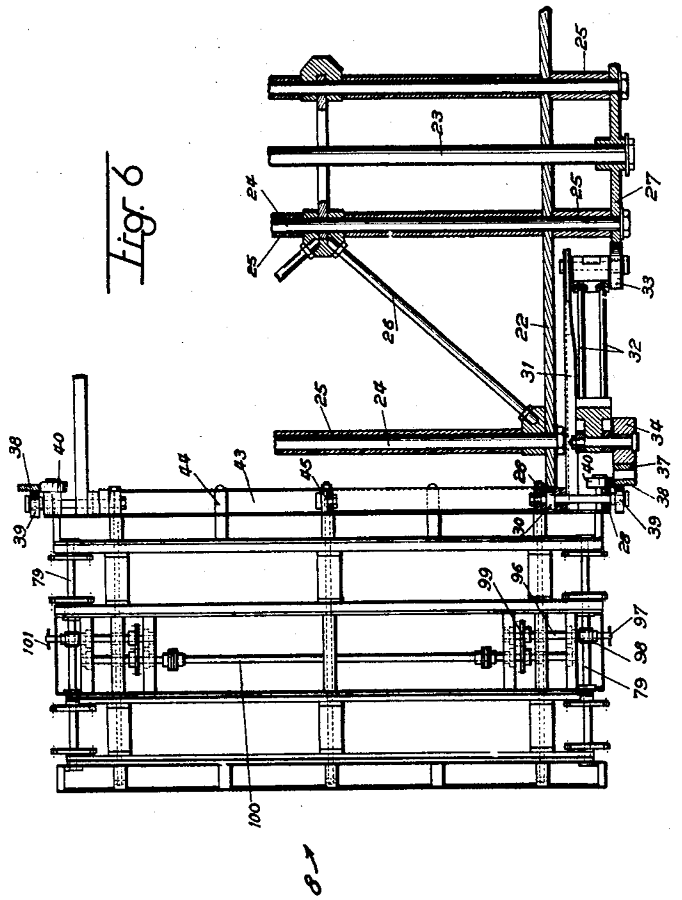
FIG. 6 is a section on line VI—VI of FIG. 5.

(*FIGS. 5 and 6*)

The elevator structure as shown in FIGS. 5 and 6 may comprise a pair of similar upper sprocket pulleys 22 mounted on a common shaft 23 and a similar pair of lower sprocket pulleys, not shown. Means, not illustrated, are provided for rotating either of the upper or the lower pulley shafts. The two pulleys 22 in each pair are interconnected by cross rods or braces 24 surrounded by spacer sleeves 25 and bolted to the pulleys. Diagonal braces such as 26 are also provided. Secured to shaft 23 through the braces 24 outwardly of the pair of pulleys 22 and rotatable bodily therewith are a pair of star-shaped cam members 27 serving a purpose presently described.

Trained about each pair of upper and lower sprocket pulleys such as 22 is an endless sprocket chain comprising the interpivoted links 28 from which the elevator platforms 8 are fixedly supported at spaced intervals. The construction of the platforms will be described in detail later. As shown, the pivots of the chain links 28 carry rollers 30 which engage in indentations 29 formed around the periphery of the pulleys 22. For maintaining the platforms 8 in their horizontal parallel relationship throughout the straight upgoing and downgoing sections of their path while providing for the smooth reversal of each platform in the end sections of their path around the upper and lower pulleys, the following means are provided.

Projecting from each platform 8 toward the elevator chain structure, axially outwardly of the pulleys, are arms 31. Three such arms are shown in FIG. 5. Pivoted to the end of each arm 31 is a pair of links 32, and the free ends of adjacent links 32 connected with adjacent arms 31 are interpivoted as shown to provide a V-linkage between each pair of platform arms 31, with its apex directed outwardly i.e. towards the elevator chain. Rollers 33 are pivoted coaxially with the pivot points of the links 32 with the arms 31, and further rollers 34 are provided coaxially with the pivot points of the links 32 at the apices of the V-linkages. The rollers 33 are arranged so that over the end portions of the elevator the rollers 33 ride along the periphery 35 of the star-shaped cam 27. The rollers 34 are arranged to ride over the surface of a continuous guiderail 36 which extends full-circle around the elevator structure to provide permanent guide means for rollers 34 and hence platform arms 31 and platforms 8. The guiderail 36 has straight vertical side portions so spaced from the straight flights of the elevator chain as to constrain the V-linkages 32 to form predetermined obtuse angles at their apices (as shown for the lowermost V-linkage to the left of FIG. 5) such that arms 31 and hence platforms 8 are constrained to maintain parallel spaced horizontal positions. However, in the end sections of the chains surrounding the pulleys, the guiderails 36 arch outward as shown at 37 to follow the circumference of the pulleys 22 thereby forcing the V-linkages to close in as shown, whereby the platform arms 31 are forced to converge radially toward the axis of shaft 23, so that with the further positive guidance contributed by the star-cams 27 and rollers 33 the platforms are caused to negotiate the turns around the upper and lower pulleys smoothly and positively.

A further guiderail 38 extending over the straight flights of the elevator chain cooperates with rollers 39 pivoted on the chain links 28 coaxially with the rollers 30 (see FIG. 6) as well as with additional rollers 39 pivoted on said chain links about axes normal to the link pivots in bearings 41 of the outer ones of links 28. Guiderail 38 is terminated at the points where the chain rollers 30 first engage and disengage the sprocket depressions 29 of the pulley. Bracing means 42 are provided for the guiderails 36 and 38.

The platforms 8 are supported from the chain links 28 through box girders 43 spanning the chains having cross braces 44. The box girder 43 is divided in two sections longitudinally, one section attached to each chain, and the two sections are interconnected by swivel means 45. The actual construction of the elevator platforms will in part be described at a later point.

MODIFIED ELEVATOR STRUCTURE

Figure 7:
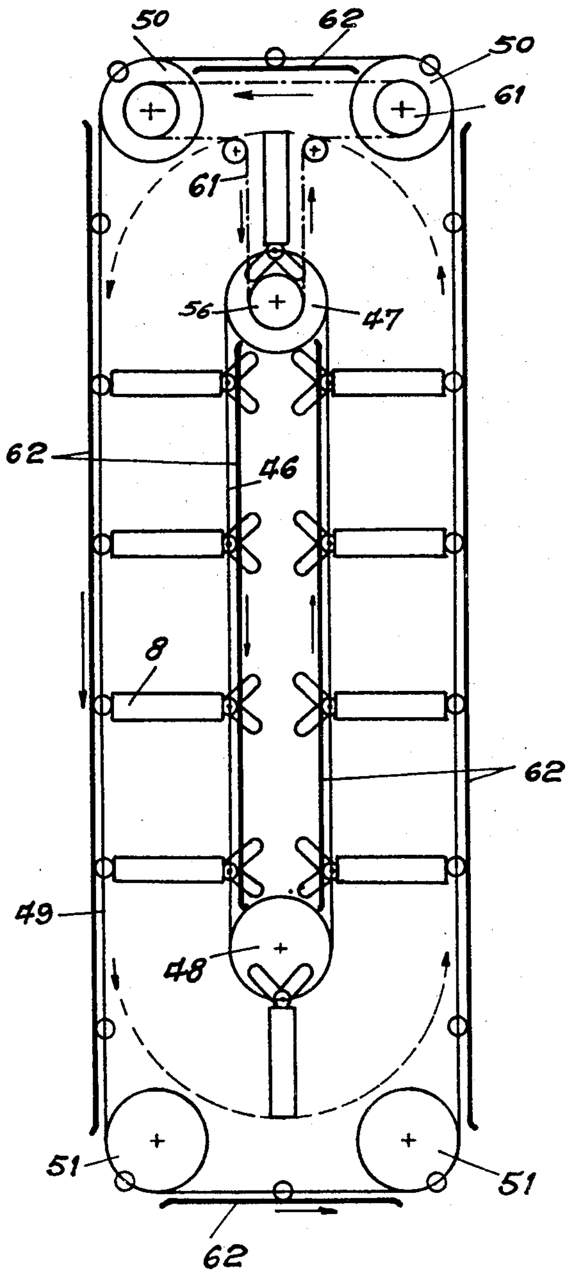
FIG. 7 is a schematic elevational view of a modified form of elevator structure according to the invention.
Figure 8:
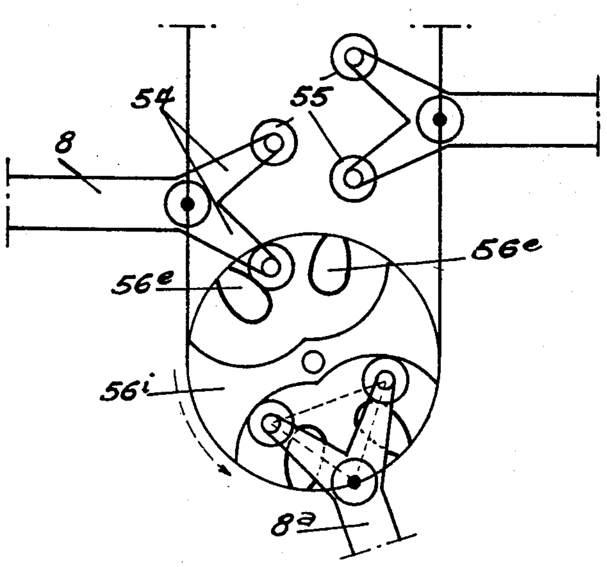
FIG. 8 is a schematic elevational view of the lower end part of the elevator structure of FIG. 7.
Figure 9:
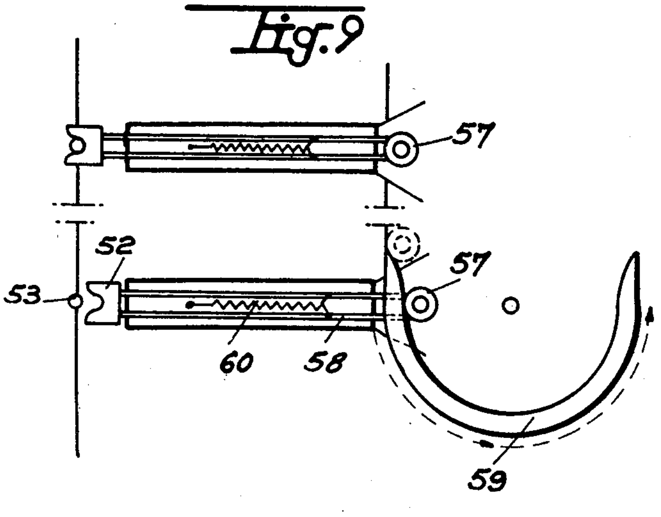
FIG. 9 is a view somewhat similar to FIG. 8 but illustrating a different detail.

(*FIGS. 7, 8 and 9*)

In the modified version of an elevator structure usable according to the invention and schematically illustrated, the endless chain means of the elevator comprises two separate loops. There is an inner loop 46, such as an endless wire rope, trained about the upper and lower pulleys 47 and 48; and an outer loop 49, e.g. another endless wire rope, which is trained about the upper pair of horizontally spaced pulleys 50 and the lower pair of horizontally spaced pulleys 51. The elevator platforms 8 have their inner ends attached to spaced points of the inner endless ropes 46, while their outer ends are provided with forks 52 (see FIG. 9) adapted to engage and disengage suitable crossbars 53 attached in spaced relation to the outer endless ropes 49. Thus throughout the vertical side sections of the elevator path i.e. in the horizontal, and possibly the loaded, conditions of the platforms 8 the platforms are supported at both sides thereof rather than being supported contilever as in the embodiment of FIGS. 5 and 6. For smooth negotiation of the top and bottom turns, each platform at its inner side is provided with two angularly-projecting arms 54 carrying follower rollers 55 pivoted thereon, for cooperation with a pair of cam structures secured coaxially to and rotatable with each of the inner pulleys 47 and 48. As shown in FIG. 8, which illustrates the lower cam structure 56, each cam structure includes a composite inner cam surface 56*i* and a plurality of separate outer cam surfaces 56*e*. The cam surfaces are so contoured, substantially as shown, that the platform follower rollers 55 are positively guided between the inner and outer cam surfaces throughout the periods that forks 52 are out of engagement with the crossbars 53 of the outer ropes, i.e. throughout the arcuate end portions of the path of travel, and guided in such manner that the platforms 8 are then maintained in radial positions as indicated at 8*a* in FIG. 8. This figure also shows that the channels defined between the outer cam surfaces 56*e* serve as smooth entrance and exit guiding means for the platform rollers 55 into and out of their cam-engaging positions.

To ensure positive disengagement of the forks 52 from the crossbars 53 toward the ends of the straight flights of the elevator, the forks 52 are mounted at the outer ends of arms 58 slidable in the platforms and biassed by springs 60 to their extended position i.e. into engagement with the crossbars 53. Each fork-mounting arm 58 has a roller 57 pivoted to its opposite end cooperating with a fixed arcuate camway 59 arranged generally coaxially with the lower and upper pulleys 48, 47 and contoured to retract the forks 52 and maintain them retracted over the arcuate portions of the paths.

For properly synchronous rotation of all the pulleys 47, 48, 50 and 51, synchronizing chains 61 are trained about suitable sprockets secured coaxially with the pulleys and about lay pinions as shown. Guiderails 62 are provided for cooperation with follower means, not shown, provided on the endless wire ropes. Any desired one or more of the pulleys shown may be driven from a power source.

POWER PLATFORM

*(FIGS. 10 and 11)*

The typical powered platform construction to be described may be used as any one of the platforms such as 5 and 9 in FIGS. 1–3, or platforms 19 in FIG. 4, as previously mentioned. The platform structure shown comprises a frame consisting of four transversely spaced longitudinal girders 63 at the bottom of the structure, with vertical longitudinal walls or partitions 64 of sheet metal secured to the sides of said girders 63 and extending upwardly therefrom so as to define the three longitudinal channels or caissons 69, 67 and 70, which may be cross-braced by conventional means not shown. The central channel 67 is covered with a horizontal upper sheet providing a central gangway while the side channels 69 and 70 are open to provide pits. Lateral gangways are provided by horizontal sheets or flanges 65 projecting from the tops of the side partitions 64.

Mounted within the pits 69 and 70 are caterpillar-like endless conveyors forming the means for supporting and transferring the vehicles. Each conveyor comprises a plurality of interpivoted elements 71 forming an endless chain. Each element 71 (see FIG. 10, upper right) comprises a shaft 72 carrying end rollers 73 adapted to ride upper and lower tracks 77 provided along the sides of the pit 69 or 70. Mounted on each shaft 72 are brackets 74 which support the tread surfaces 75 upon which the wheels of the vehicles are supported. In a modified form, the tread surfaces 75 and their supporting brackets may be omitted and freely rotatable roller means provided instead. All the adjacent shafts 72 are interconnected by endless chains 76 near their opposite ends, there being two such endless chains in each pit, trained around end sprocket pulleys 78. The sprocket pulleys are secured on common shafts 79 extending across the ends of the platform and journalled in the four vertical walls or partitions 64 in suitable bearings.

For displacing the conveyor chains of the power platform, a drive motor 82 is provided at a suitable central position in the platform. While the means for driving the conveyors from the motor may assume various conventional forms and will not be described in detail, the means shown are broadly the following. Motor 82 has two output shafts for driving the respective conveyor drive shafts 79 at the opposite ends of the platform through transmission systems which are generally similar and only one of which will now be briefly described. The output shaft from motor 82 is coupled to the input shaft of a first gear reducer 83 having two parallel spaced output shafts 81 and 84. Shaft 81 is coupled at its outer end with the input shaft of a reducing gearbox 80 having a worm secured thereon (as is apparent from FIG. 11) meshing with a wormgear secured on conveyor drive shaft 79. The other motor-driven shaft 84 is connected by way of an electromagnetic clutch unit 85 and coupling 86 with a dual output coupling 87–88 at one end of the platform, or a single output coupling 89 at the other end. The output couplings provide power takeoffs for a purpose that will later appear.

Figure 10:
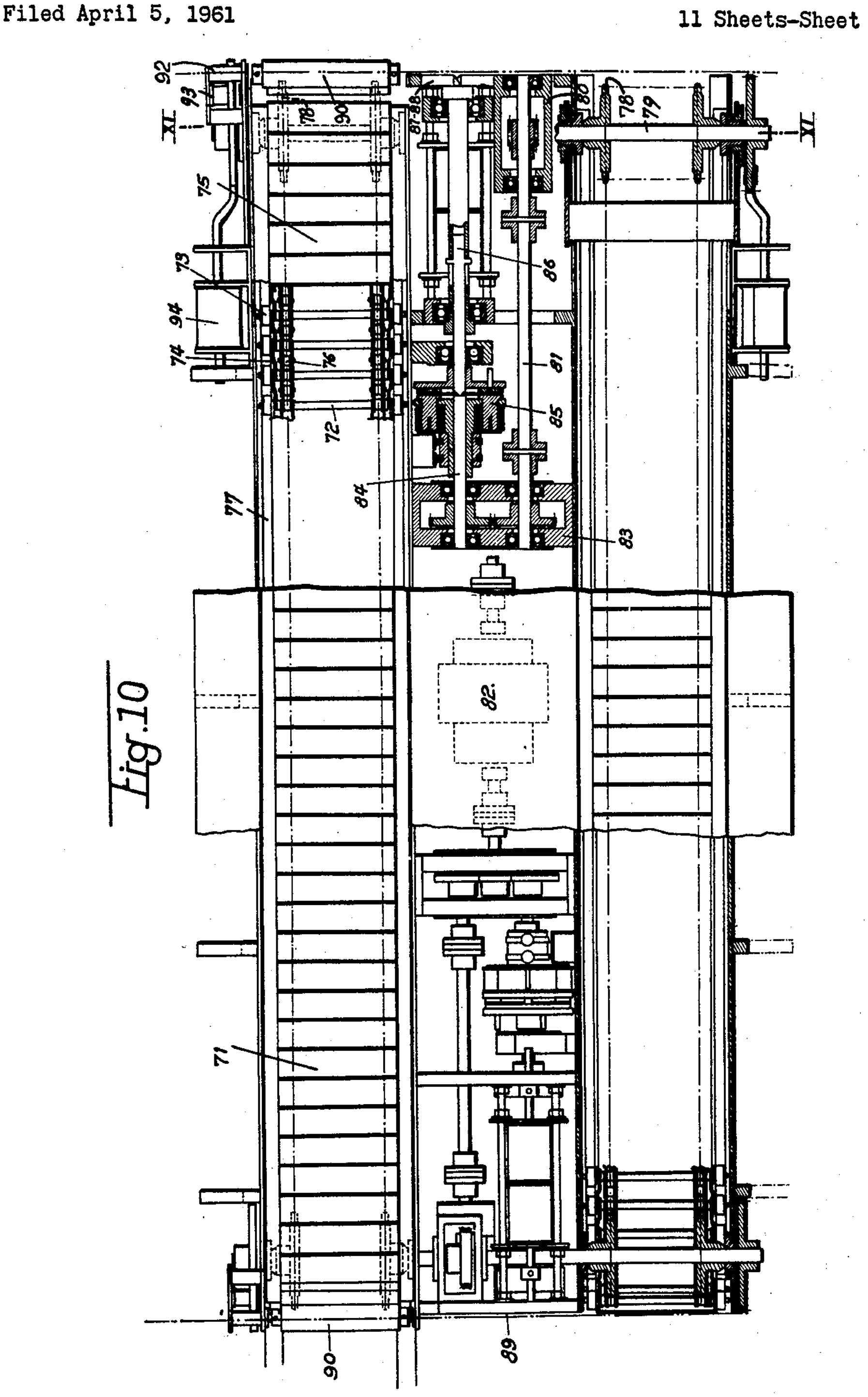
FIG. 10 is a plan view, partly in section showing a so-called power platform for use in a garage according to the invention.
Figure 11:
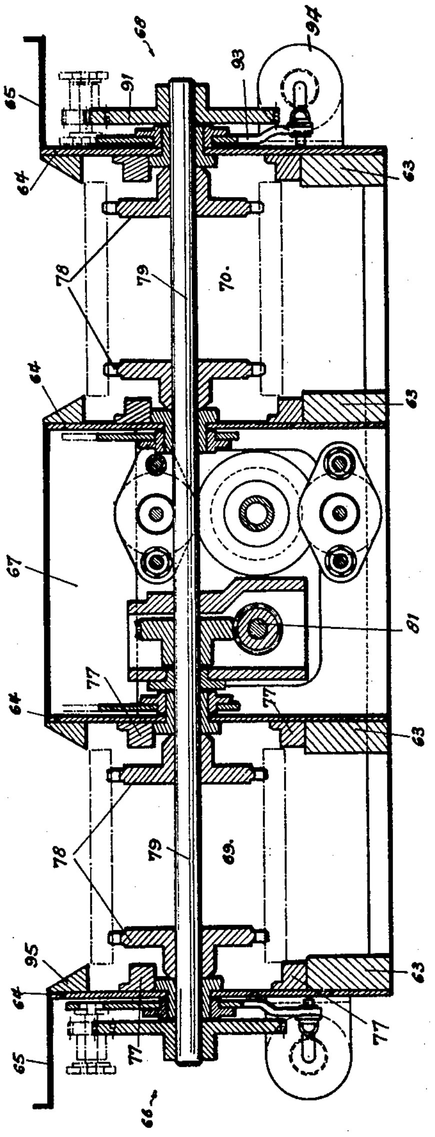
FIG. 11 is a section on line XI—XI of FIG. 10.

For providing a smooth transition between the power platform described and an adjacent idle platform in the transfer of a vehicle from one to the other platform, there are provided end rollers 90 journalled across the ends of the platform structure so as to protrude therefrom into engagement between the adjacent ends of the conveyor means of the respective platforms. The rollers 90 are adapted to be driven in rotation in synchronism with the conveyors. For this purpose each roller 90 has a drive pinion 92 secured to it outwardly of the platform and meshing with a gear 91 (see FIG. 11) secured on the related shaft 79. The platform shown in FIG. 10 is assumed to constitute one of the platforms such as 5 or 5′ in FIG. 2, or 9 or 9′ in FIG. 1, and to cooperate at its righthand end (FIG. 10) with an elevator platform 8 or 8′. Accordingly it is necessary for the transition rollers 90 at the right hand end of the platform (in FIG. 10) to be retractible in order to accommodate the vertical movements of the adjacent elevator platform 8. For this purpose each of the rollers 90 at the right of FIG. 10 is mounted on a rockable frame 93 connected through a link visible in FIG. 10 with the armature of a solenoid 94 so that energizing the solenoid will rock the frame 93 to retract the roller 90 sufficiently to clear rollers 90 out of the path of vertical movement of the elevator platforms. In FIG. 11, reference 95 designates one of a set of protection rails or flanges overlapping the sides of the upper flights of the conveyors for the safety of personnel and also for sealing the mechanism below against the ingress of foreign objects and dirt.

IDLER PLATFORM

*(FIGS. 5 and 6)*

The elevator platform 8 shown in FIGS. 5 and 6 and previously described in part, is selected as typical examples of the idler platforms used in this embodiment of the invention. The general structure of such idler platforms may be broadly the same as that of the power platforms earlier described, with minor differences ascribable to the particular functions of the platform considered, and which need not be described in detail. The idler platform 8 has a pair of endless caterpillar-like conveyor chains mounted longitudinally along the sides of it in a manner similar to that disclosed with reference to FIGS. 10 and 11, and including the transverse shafts 79 journalled across the ends of the platform. In this case however no motor or transmission means are provided on the platform itself since the conveyor means of the idler platform are arranged to be driven from that of a power platform positioned adjacent to it. Accordingly, idler platform 8 has two short coupler shafts 96 journalled in the platform frame in alignment along the central longitudinal axis of the platform at the opposite ends of it. Each shaft 96 carries at its outer end a coupling means 97 or 101 adapted for cooperation with the power takeoff coupling means 87–88 of the adjacent power platform. At each end of the platform, a bevel gearing 98 transmits rotation of shaft 96 to the adjacent conveyor drive shaft 79 of the idler platform. Moreover a gearing 96 transmits rotation of shaft 96 to a longitudinal transmission shaft 100 extending the length of the platform to drive the opposite conveyor drive shaft 79, whereby a drive is provided for the idler platform conveyor irrespective of which end the drive is to be derived from. It is recalled in connection with the elevator platforms that these are necessarily reversible since the same platform must be capable of receiving a vehicle loaded on one surface of it in the upgoing flight of the elevator and the opposite surface in the downgoing flight. This entails the necessity of suitable modifications in the general structure of the platform from that described in relation to FIGS. 10 and 11 in order to provide over-all symmetry to either side of the horizontal midplane of the idler platform.

MODIFIED IDLER PLATFORM

*(FIGS. 12, 13 and 14)*

Figure 15:
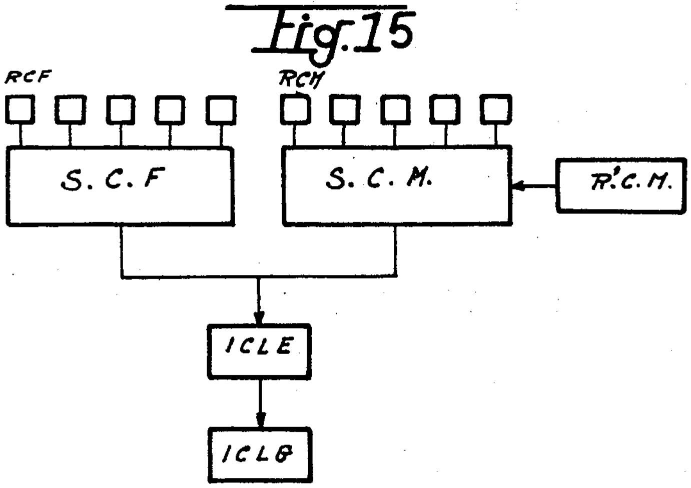
FIGS. 15 and 16 are functional information signal-flowsheet diagrams illustrating automatic selection and control features of the invention.

The modified form now to be described is suitable for use as an end platform beyond which a vehicle is not required to travel, such as any one of the circulatory platforms 10 in FIG. 1, or a stationary storage location 20 or 21 (FIG. 4). While the general arrangement of the platform is similar to that shown in FIGS. 10 and 11, one difference is that the drive coupling means in this case are provided at one end only of the platform, as at 102. A with FIG. 4. Each storage location has associated with it a binary or two-state element, such as a relay or a flip-flop and means (e.g. a photocell) arranged to sense the vacant or occupied condition of the location and cause the associated bistable element to assume one or the other of its two states depending on whether the location is vacant or occupied. In FIG. 15, the boxes labelled RCF indicate such condition-responsive elements or relays associated with the respective fixed storage locations (such as 20, 21 in FIG. 4), and the boxes RCM indicate the similar bistable elements or relays associated with the respective movable storage locations (such as 19 in FIG. 4). All the relays RCF are shown connected to a Fixed Location Selector SCF, and all the relays RCM are shown connected to a Movable Location Selector SCM. Moreover, the box R'CM designates a device, such as a digital register or counter, adapted to store the numerical designation of the particular movable location or circulatory platform positioned adjacent to the down going elevator platform landing. Device R'CM may be termed the Movable Location Identifier. It will be understood that the components of FIG. 15 so far described are provided at each of the levels of the garage. Since the first problem to be dealt with on arrival of a car into the garage for long-term storage, will, usually, reside in determining the most quickly accessible, vacant, fixed storage location to which the incoming car is to be directed, the Fixed Location Selector SCF is arranged, on receipt by it of a command signal from the central control station as presently described, to issue questioning pulses to each of the Fixed Location Relays RCF in sequence, starting with the relay associated with the fixed storage location nearest to the elevator landing, until a relay RCF has been found which indicates a vacant condition of the associated fixed storage location, whereupon selector SCF transmits this information to a Level Vacancy Indicator ICLE positioned at the level considered and preferably including a display panel in which the identity of the nearest vacant locations are visibly displayed. Simultaneously, Movable Location Selector SCF transmits questioning pulses to Movable Location Indicator R'CM and, failing a satisfactory response therefrom indicating that the circulatory platform positioned next the elevator happens to be vacant, proceeds to transmit such pulses to each of the Movable Storage Location Relays RCM until a vacant one is found, at which time the designation of the nearest vacant movable location is likewise transmitted from selector SCM to Level Vacancy Indicator ICLE which has capacity to register the conditions of all the storage locations, fixed and movable, of the level. Preferably the questioning pulses issued by each of the selectors SCF and SCM to each of the sets of relays are arranged to be issued in alternating sequence first left, then right, and so on, starting with the point nearest the elevator landing.

The Level Vacancy Indicator such as IGLE of the respective levels may be actuated in sequence in descending order, and the information obtained therein transmitted sequentially to a Garage Vacancy Indicator ICLG stiuated e.g. at the central control station aboveground. In this way, a command signal transmitted from the central control station will at any time provide thereat the desired information as to which are the most quickly accessible vacant movable and fixed storage locations in the garage. This information can then be used (manually or automatically) at the control station to direct the incoming car into the thus determined storage location, by a process presently described with reference to FIG. 16. In this connection it will be noted that for the long-term parking of a vehicle the nearest fixed location would normally be used, while for short-term parking a movable location may be preferred. In any case knowledge of the nearest movable storage location (i.e. circulatory platform) is necessary for the proper control of the rotation of the circulatory chain at the selected level as will be evident from earlier explanations and will presently appear in further detail.

It should be noted that there may be cases where an incoming car should be directed to some particular predetermined storage location (e.g. a location leased to the owner of the car) rather than to the nearest vacant location.

Figure 16:
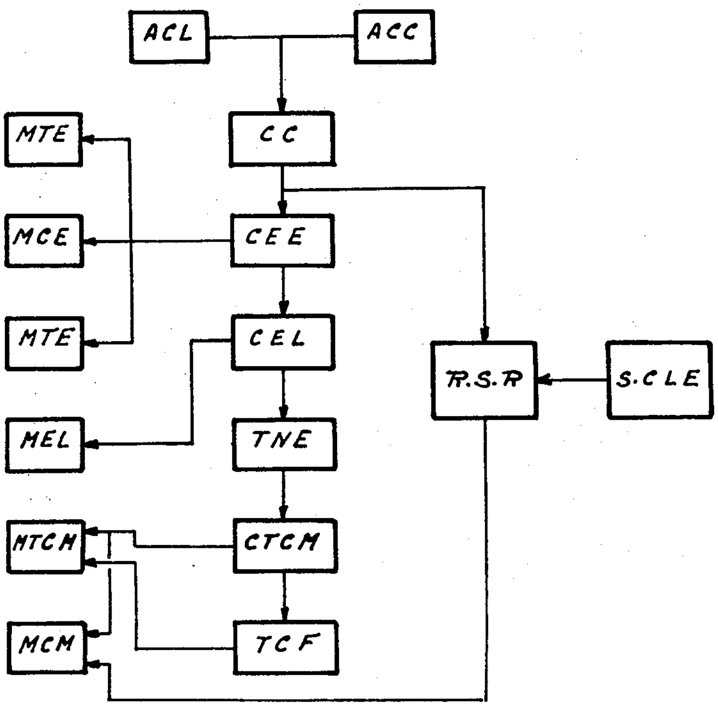

Referring to FIG. 16, box CC designates a Central Controller provided at the central control station and operable to transmit signals causing the operation of all the desired motors throughout the garage in the proper sequence for conveying an incoming vehicle to a desired storage location, as presently described. Central controller CC is shown, in the schematic data flowsheet, as connected through data-transmission lines with a Nearest Vacancy Controller ACL and a Selected Location Controller ACC. Controller ACL may be connected with the afore-mentioned Garage Vacancy Indicator ICLG, through means not shown, so as to transmit to the Central Controller CC a digital signal indicative of the nearest vacant location (fixed or movable as desired). As to Selected Location Controller ACC this would be operable in the afore-mentioned instance where a vehicle is to be directed to a predetermined location regardless of whether or not it is the nearest vacant location; controller ACC may simply comprise a keyboard or dial on which the digital designation of the selected location can be keyed or dialled to operate Central Controller CC accordingly.

In either case the digital Code signal (a storage location designation) thus applied to Controller CC will now cause the latter to transmit pulse signals for operating the appropriate motors of the system for automatically conveying the incoming car to the specified storage location. Some of said motors are operated in parallel to gain time as will be explained. Thus it is evident that, for example, the motor of the circulatory drive chain 16 in the selected level can be operated to bring a vacant circulatory platform into register with the elevator union at the same time as, say, the motor of elevator 7 is being operated to lower the car to said level.

The various motors of the system are schematically represented in FIG. 6 by the vertical row of boxes at the left of the figure. These include: Input Platform Motor MTE which is the motor driving the longitudinal conveyor on a power platform mounted on presentation conveyor 5. Presentation Conveyor Motor MCE which is the motor driving the presentation conveyor on which the foregoing platforms are mounted; it is noted that motor MTE is shown twice in FIG. 16 because it has to be operated twice as will presently appear. Then there is the Elevator Motor MEL; a circulatory Platform Motor MTCM (the motor operating the conveyor of a circulatory platform 19 for transferring a vehicle from the landing of elevator 7 to a circulatory platform in the embodiment of FIG. 4 to which the present description particularly refers); and finally the circulatory Drive Chain Motor MCM.

Block RSR designates a Rotation Sense Selector. This is a digital circuit (of which various types are known) capable of discriminating between the two possible senses of rotation of the circulatory drive chain and selecting the particular sense which will bring the nearest vacant circulatory platform to a position adjacent the elevator landing with the shortest amount of travel. The Selector RSR is therefore shown as responsive, through electric data transmission lines, to the Level Vacancy Indicator SCLE and to Central Controller CC. On transmission of the digital signal designating the desired storage location from controller CC, Selector RSR is immediately operated to start operation of the drive chain motor MCM as long as required to bring the nearest vacant circulatory platform 19 to the elevator landing at the selected level, at which time motor MCM is stopped. At the same time the signal from Controller CC is transmitted to an Elevator Input Controller circuit CEE which in turn transfurther difference is that the conveyor means in such a platform extend only over a minor part of the length of the platform from the end at which the drive coupling 102 is provided. As shown therefore the conveyor drive shafts 103 are arranged a short distance apart. Beyond the inner ends of the foreshortened conveyor belts fixed tread surfaces 104 are provided flush with the upper surfaces of the conveyors along the sides of the platform. References 105, 106 and 107 designate transverse frame elements of the platform.

It will be understood that in a platform as last described the foreshortened conveyor means will suffice to transfer a vehicle completely to or off the platform by engagement with the rear wheels thereof.

CIRCULATORY PLATFORMS

*(FIGS. 12–14)*

Figure 12:
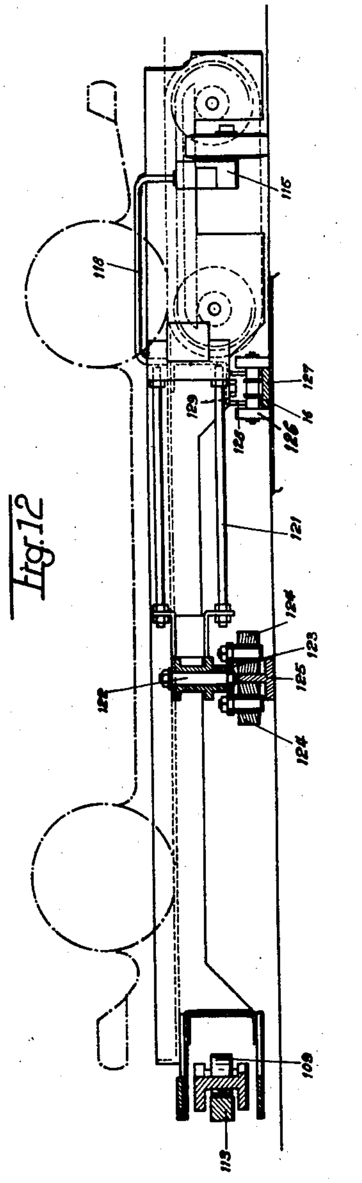
FIG. 12 is a side elevational view, partly in section showing an idle platform for use in a garage according to the invention.
Figure 13:
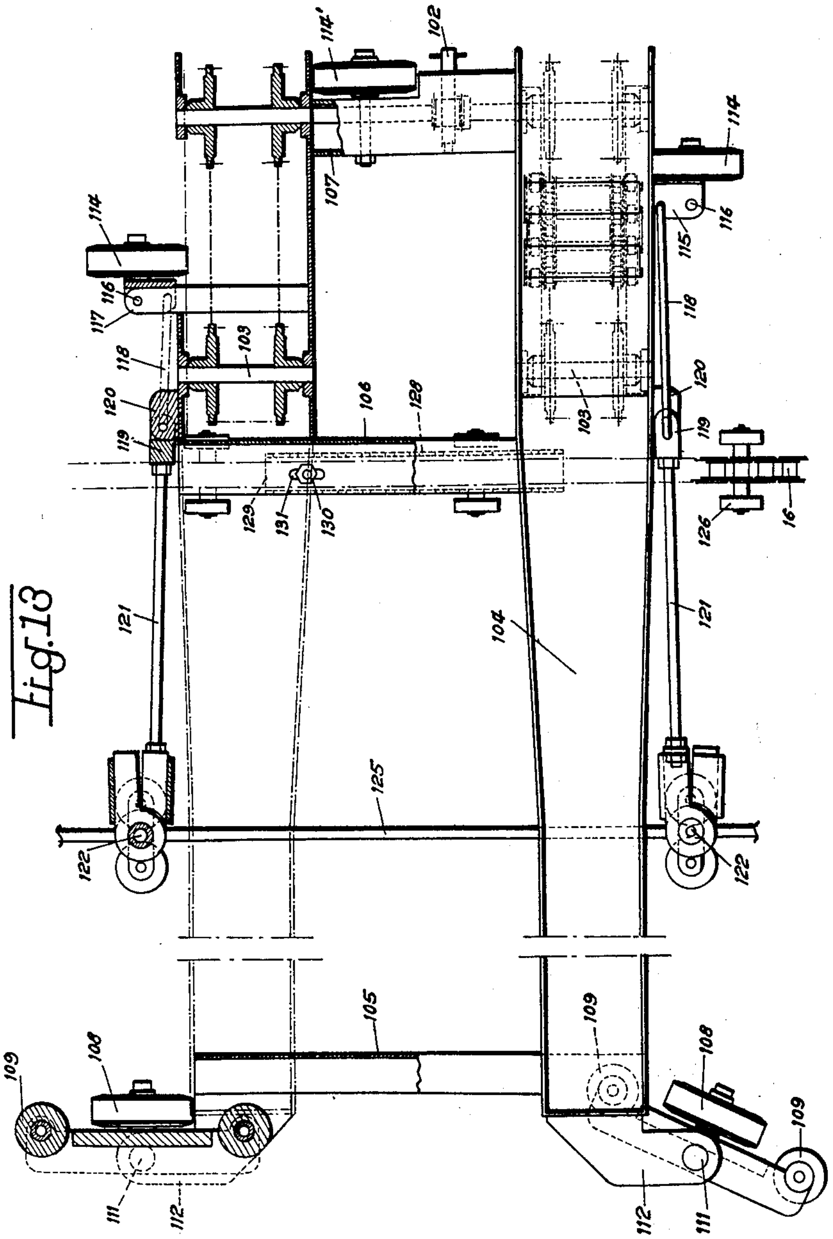
FIG. 13 is a plan view of the platform of FIG. 12 partly in section.
Figure 14:
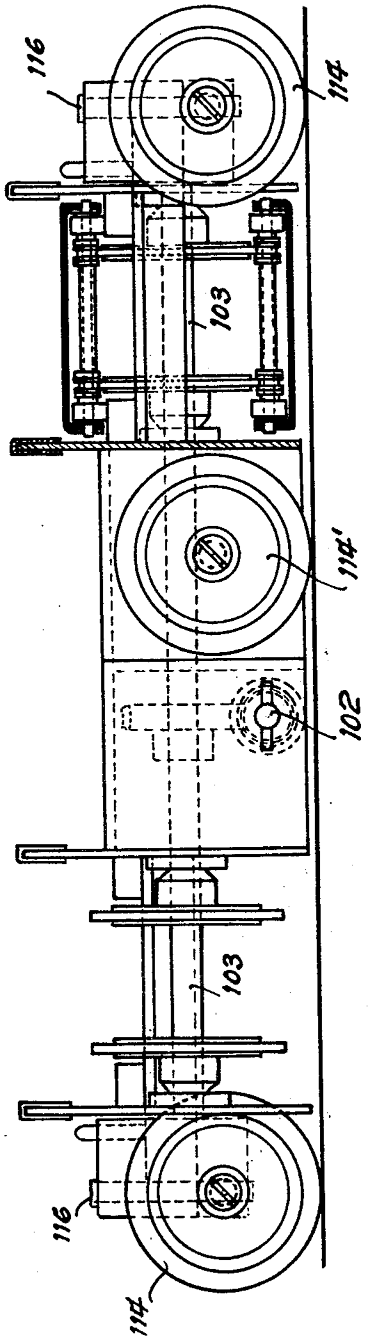
FIG. 14 is an end view thereof, partly in section.

FIGS. 12, 13 and 14 further illustrate features useful in connection with the circulatory platforms such as 10 in FIG. 1 or 19 in FIG. 4. It should therefore be understood that the features now to be described are applicable separately from the other features of FIGS. 12 to 14 described above, since they would be applicable for example to a circulatory platform such as 19 in FIG. 4 which would otherwise be constructed on the general lines of FIGS. 10 and 11.

The platform shown in plan in FIG. 13 may be assumed to constitute one of the circulatory platforms 10 of FIG. 11, with the left end of the platform in FIG. 13 corresponding to the inner end of a platform 10 in FIG. 1, i.e. that end positioned on the inside of the loop. At said inner end, then, the platform shown in FIG. 13 has a pair of castors 108 riding the floor surface and each mounted on a swivel frame swivelled through vertical pivots 111 on arms 112 extending outwards from the end of the platform. The swivel frame further carries a pair of rollers 109 pivoted on vertical axes at the opposite ends of it, which rollers are adapted to engage with an endless rail 113 (see FIG. 12 and also FIG. 1) running around the inside of the track. At the outer end of the platform there is provided a single wheel 114' mounted on a fixed horizontal pivot extending longitudinally of the platform for transverse rolling movement of the said outer end of the platform over the floor surface. Two side rollers 114 are further provided. These are castor rollers, being mounted on swivel frames 115 connected through vertical pivots 116 with arms 117 projecting outboard from the platform structure, at points which may be longitudinally displaced as apparent from FIG. 13. The swivelling motions of the castor rollers 114 about pivots 116 are not permitted to take place freely as is the case of the inner castors 108, but rather are constrained in a manner presently described to cause the castors 114 to be properly oriented throughout the curves negotiated by the platforms at the ends of their closed-loop track.

Each of the circulatory-type platforms being described has coupling links 121 pivoted to its opposite sides for pivoted connection at their free ends with the free ends of the corresponding coupling links 121 of adjacent platforms. As shown in FIG. 12, each coupling link 121 actually comprises a pair of vertically spaced parallel link elements operating as a unit and will hence be referred to as if it were one link. Each coupling link 121 has one end secured to a support 119 pivoted on a vertical axis to a bracket 120 projecting from the related side of the platform, and extends generally toward the inner end of the platform. At its free end the link 121 is pivoted about a vertical pivot 122 to the free end of the adjacent link of an adjacent platform by way of a swivel frame which carries a pair of rollers 124 freely rotatable on vertical axes for engagement with the opposite sides of a rail 125. This rail 125 as clearly indicated in FIG. 1 forms a closed loop extending around the circulatory track of the platforms about midway between the inner and outer boundaries of the track. As will be apparent from FIG. 1 the dimensioning is such that throughout the straight side laps of the circulatory track the V-linkages defined by the interpivoted coupling links 121 between the platforms are all closed in and the platforms consequently all extend parallel in serried ranks. However in the arcuate end portions of the circulatory track the said V-linkages are forced to open out, and the platforms correspondingly fan out so as to assume radial diverging positions, i.e. normal to the arcuate end contours of the track, throughout the turn. Further, the coupling link supports 119 are connected by links 118 with the swivel frames 115 of the side castors 114 so that said frames are rotated as required to keep the castors properly oriented. Thus in the straight portions of the track, links 118 pull the castor frames to the positions shown in FIG. 13 where the castors lie in transverse planes, while in the arcuate parts of the track the castor frames 115 are pulled by coupling links 121 acting through links 118 so that the castors assume the proper angled positions to cause the platform to turn about its instantaneous center of rotation. This feature contributes to a smooth, jolt-free travel of the heavily-loaded platforms around the closed-loop circulatory track.

DRIVE CHAIN

*(FIGS. 1, 12 and 13)*

For rotating the platforms such as 10 around the circulatory track on each level, there is provided an endless drive chain 16 driven lengthwise through suitable transmission from a central power group 15. As shown in FIGS. 12 and 13 the chain 16 is fitted with spaced pairs of rollers 126 riding the floor on opposite sides of a flat guide strip or tram rail 127. The chain is engaged by an elongated rack member 128 in the form of a channel element 129 having suitably indented flanges attached to the under side of a cross member 106 of the platform, the attachment means preferably comprising a bolt 130 and an elongated slot 131 to provide some give and take and thus facilitate engagement and disengagement between the rack and chain. It will be understood that in the arcuate end portions of the track the platforms are propelled by the draft transmitted through the coupling links 121 rather than by the meshing engagement between the rack and chain.

The description of the principal mechanical components of the system (in the exemplary embodiment shown) has now been completed. It will now readily be grasped that considered in toto the handling of a motor vehicle through the garage described can be regarded as involving successive longitudinal transfers of the vehicle from an idler platform to a powered platform to an idler platform repeatedly, with the additional possibility of one or more of said platforms performing a transverse, horizontal or vertical, shifting displacement with the vehicle charged thereon between successive longitudinal transfers.

AUTOMATIC CONTROL

*(FIGS. 15 and 16)*

1t will be readily apparent that the over-all garage (or other storage) system described is admirably suited for operation by automatic remote-control techniques, even though individual features of it may well find advantageous uses apart from such type of operation. The ensuing exemplary description will serve to illustrate in general terms the manner in which such automatic control can be applied to the system described herein by the use of digital information-processing or digital computer equipment, preferably electronic in character, which equipment will not per se be described in detail in view of its generally well-known character.

The description will be conducted with special reference to the form of the invention including both movable and fixed storage locations, as described in connection mits starting pulse signals in sequence to the Input Platform Motor MTE to transfer the vehicle from the drive-in platform 4 to the adjacent input platform on conveyor 5, then the Presentation Conveyor Motor MCE to shift the input platform with the car on it laterally into register with the elevator 7; and finally the Input Platform Motor MTE again to transfer the car on to the elevator platform. The signal is then passed to an Elevator Controller circuit CEL which issues a start command to the elevator motor MEL for lowering the car to the selected level. From this point it is evident that the control signal must be dispatched to the particular lever containing the selected storage location to operate the motors at that level and no other. Hence the control signal is shown as being passed to a Level Dispatcher circuit TNE which senses the part of the control signal designating the level number and dispatches the signal to the designated level. At this level the signal is received by a Circulatory Platform Transfer circuit CTCM which issues a start command to the Circulatory Platform Motor MTCM whereby the longitudinal conveyor on the circulatory platform (a power platform in this embodiment) at the selected level is operated to transfer the vehicle from the elevator platform to the vacant circulatory platform that has previously been positioned adjacent said landing as earlier described. The command from circuit CTCM is also transmitted to the Circulatory Drive Chain Motor MCM to resume motion of the circulatory chain for bringing the circulatory platform carrying the vehicle into register with the desired fixed storage location. Finally the control signal is applied to a fixed Location Transfer circuit TCF which again issues a start command to the circulatory Platform Motor MTCM to transfer the vehicle from this platform to the final fixed location.

Desirably the central controller has conventional printing and/or punching means (or other recording means) associated with it for recording the storage location to which a vehicle has been delivered, e.g. on duplicate cards, one for the car owner and one for the files. According to an especially desirable form of the invention, the central controller may be arranged for direct actuation on insertion of a punched card thereinto. Thus the car owner can himself insert his card into the controller to initiate the automatic process that will extract his car from the parking location and deliver it to the output of the garage without even having dealings with a garage attendant. A similar fully customer-serviced automatic process can of course be used for ingoing operations also, i.e. for delivering a car to a parking location.

It will be understood that the highly schematic and exemplary flowsheet diagram of FIG. 16 is subject to a great many variations. As one example, means are advantageously provided for immediately rotating the circulatory chain of the level, on delivery of a vehicle to its fixed storage location, to a position at which a vacant circulatory platform is standing adjacent the elevator landing. The actual details of the circuitry can be varied ad libitum. While electromechanical relay circuitry can be used, electronics may usually be preferred and the circuitry would then assume the conventional form of flipflops delay lines, and logical networks incorporating tubes or solid-state elements, as well as magnetic or other memory means, familiar in digital computer and digital automatic control engineering.

From the exemplary description of the process for delivering an incoming vehicle to a desired storage location as described above, the generally reverse process of identifying the location of a stored vehicle and directing it to the output of the garage will be easily deduced.

Thus it can be seen that there has been described a load storage and handling system, and specifically a vehicle storage and handling system, in which the various objects of the invention as earlier set forth are achieved.

What I claim is:

1. A vehicle handling and storage system comprising a series of parallel input platforms at ground level, a transfer conveyor at the level of said input platforms for receiving vehicles from all of said platforms and adapted to move a particular vehicle received from any one of said platforms in a direction transverse to the longitudinal axis of said vehicle, elevator means having a vertical array of elevator platforms and power means for bodily displacing said array vertically to bring a selected elevator platform into longitudinal alignment with said transfer conveyor, a plurality of vertically spaced levels for receiving from said elevator platforms a vehicle at each of said levels, a plurality of vehicle receiving platforms at each of said levels, means defining a closed-loop path having straight sides and arcuate ends, power driven means for moving said vehicle receiving platforms in spaced positions around said path for bodily movement therearound, one of the straight sides of said closed-loop path being in alignment with the platforms of said array of elevator platforms whereby to receive from any one of said elevator platforms on one of said vehicle receiving platforms a vehicle with the vehicle in the same relative position on said vehicle receiving platform as said vehicle occupied originally relatively to said input platforms, together with an output platform for accepting a vehicle from said elevator platforms at the ground level at the side opposite the transfer conveyor whereby a vehicle may be driven directly from the input platforms to said transfer conveyor and one of said elevator platforms outwardly to said output platform, or may be transferred downwardly from said transfer conveyor by an elevator platform to one of the vehicle receiving platforms at storage level and then brought back to the input level for movement outwardly from the elevator platform in the same direction as received originally by the input platforms.

2. A vehicle handling and storage system comprising a series of parallel input platforms at ground level, a transfer conveyor at the level of said input platforms for receiving vehicles from all of said platforms and adapted to move a particular vehicle received from any one of said platforms in a direction transverse to the longitudinal axis of said vehicle, elevator means having a vertical array of elevator platforms and power means for bodily displacing said array vertically to bring a selected elevator platform into longitudinal alignment with said transfer conveyor, a plurality of vertically spaced levels for receiving from said elevator platforms a vehicle at each of said levels, a plurality of vehicle receiving platforms at each of said levels, means defining a closed-loop path, power driven means for moving said vehicle receiving platforms in spaced positions around said path for bodily movement thereabout, a portion of said closed-loop path being in alignment with the platforms of said array of elevator platforms whereby to receive from any one of said elevator platforms on one of said vehicle receiving platforms a vehicle with the vehicle in the same relative position on said vehicle receiving platform as said vehicle occupied originally relatively to said input platforms, together with an output platform for accepting a vehicle from said elevator platforms at the ground level at the side opposite the transfer conveyor, whereby a vehicle may be driven directly from the input platforms to said transfer conveyor and one of said elevator platforms outwardly to said output platform, or may be transferred downwardly from said transfer conveyor by an elevator platform to one of the vehicle receiving platforms at storage level and then brought back to the input level for movement outwardly from the elevator platform in the same direction as received originally by the input platforms.

3. In the combination of claim 1, stationary storage platforms at certain of said levels positioned so that said vehicle receiving platforms when moving in said closed-loop path are aligned with said stationary storage platforms for transferring vehicles between said vehicle receiving platforms and said stationary storage platforms.

4. In the combination of claim 2, stationary storage platforms at certain of said levels positioned so that said vehicle receiving platforms when moving in said closed-loop path are aligned with said stationary storage platforms for transferring vehicles between said vehicle receiving platforms and said stationary storage platforms.

References Cited in the file of this patent

UNITED STATES PATENTS

| | | |
|---|---|---|
| 140,076 | Rightor | June 17, 1873 |
| 1,528,893 | Rother | Mar. 10, 1925 |
| 1,796,119 | Olson | Mar. 10, 1931 |
| 1,851,262 | Riblet | Mar. 29, 1932 |
| 1,905,229 | James et al. | Apr. 25, 1933 |
| 1,969,002 | Gleichman | Aug. 7, 1934 |
| 1,975,717 | Harris | Oct. 2, 1934 |
| 2,342,468 | Hallwood | Feb. 22, 1944 |
| 2,828,873 | Arlin | Apr. 1, 1958 |
| 2,916,168 | Coursey | Dec. 8, 1959 |
| 3,032,212 | Gaskin et al. | May 1, 1962 |

FOREIGN PATENTS

| | | |
|---|---|---|
| 717,018 | Great Britain | Oct. 20, 1954 |
| 1,098,912 | France | Mar. 16, 1955 |